United States Patent [19]

Fukazawa et al.

[11] 4,045,802
[45] Aug. 30, 1977

[54] INK EJECTION PRINTING APPARATUS COMPRISING AUTOMATICALLY ACTUATED EJECTION ORIFICE CAP

[75] Inventors: Takao Fukazawa; Takuro Isayama; Kyuhachiro Iwasaki; Hiromichi Komai, all of Tokyo, Japan

[73] Assignee: Ricoh Company, Ltd., Tokyo, Japan

[21] Appl. No.: 709,021

[22] Filed: July 27, 1976

[30] Foreign Application Priority Data

July 29, 1975 Japan .............................. 50-92369
Nov. 13, 1975 Japan .............................. 50-136483

[51] Int. Cl.² ............................................ G01D 15/18
[52] U.S. Cl. ............................................ 346/140 R; 346/75
[58] Field of Search .................................. 346/75, 140

[56] References Cited

U.S. PATENT DOCUMENTS

| | | | |
|---|---|---|---|
| 3,039,438 | 6/1962 | Brown ................................. | 346/140 |
| 3,346,869 | 10/1967 | Stone ................................. | 346/140 X |
| 3,839,721 | 10/1974 | Chen et al. ........................ | 346/140 X |
| 3,945,020 | 3/1976 | Kraus et al. ...................... | 346/75 |

*Primary Examiner*—George H. Miller, Jr.
*Attorney, Agent, or Firm*—Frank J. Jordan

[57] ABSTRACT

An ink ejection head is moved to an inoperative position when the apparatus is de-energized. An electrical solenoid moves the cap to a retracted position as the ink ejection head approaches the inoperative position and another electrical solenoid or a spring moves the cap into injection orifice sealing engagement with the ink ejection head when the ink ejection head reaches the inoperative position. Damping means are disclosed for preventing impact of the cap against the ink ejection head which would cause erroneous ink ejection and resilient means are disclosed for ensuring sealing alignment of the cap against the ink ejection head.

15 Claims, 8 Drawing Figures

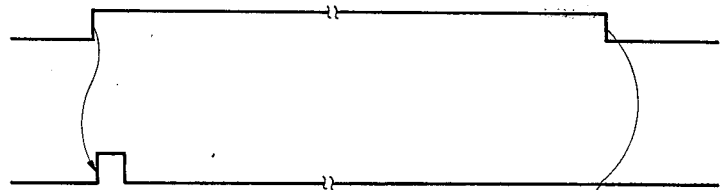
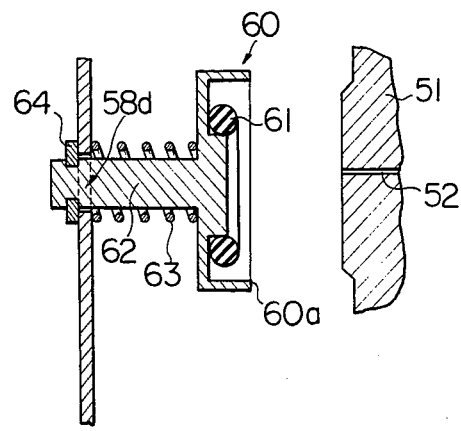
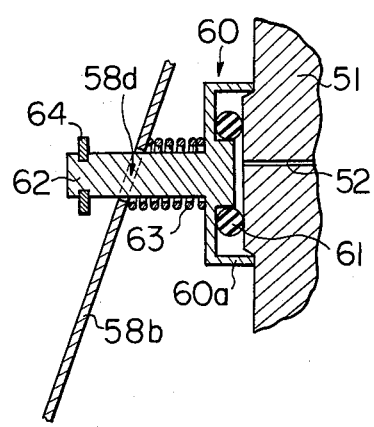

INK EJECTION PRINTING APPARATUS COMPRISING AUTOMATICALLY ACTUATED EJECTION ORIFICE CAP

BACKGROUND OF THE INVENTION

The present invention relates to an ink ejection printing apparatus comprising means for automatically preventing clogging of an ink ejection orifice.

Printers are presently being developed for use in facsimile systems and the like which utilize the principle of ink ejection. An ink ejection head formed with a tiny ink ejection orifice is moved in a scan direction adjacent to a sheet of copy paper and electrical signals are applied to the head to cause ink ejection onto the copy paper at positions corresponding to dark portions of the image being reproduced. An effective ink ejection head utilizes the electrostrictive effect in which application of an electrical pulse to an electrostrictive plate in the ejection head causes a tiny drop of ink to be ejected which forms a dot on the copy paper. The paper is fed perpendicular to the scan direction to reproduce successive scan lines and ultimately the entire image.

In order to accomplish satisfactory ink ejection, the diameter of the ejection orifice must be extremely small and the ink passageway leading thereto relatively long and narrow. In addition, the ink used must be rather thick in order to provide sufficient contrast for the reproduced image. This configuration, unfortunately, is conducive to drying of the ink in the area of the orifice which results in an ink clog rendering the ejection head inoperative.

Various means have been proposed to prevent such clogging. It has been attempted with unsuccessful results to prevent clogging by recessing the orifice in the ejection head. Another expedient is to provide a cap which the apparatus operator fits on the ejection head after using the apparatus to hermetically seal the orifice.

The latter method, although effective if the operator is careful and conscientious, is disadvantageous in daily practical use. Careless operators often neglect to fit the cap or fit it in a rough manner which causes ink ejection into the cap. This causes a build-up of dried ink in the cap which destroys the hermetic seal rendering the cap useless even if fitted.

SUMMARY OF THE INVENTION

It is an object of the present invention to provide an ink ejection printing apparatus which positively prevents clogging of ink in the ejection orifice.

It is another object of the present invention to provide an ink ejection printing apparatus comprising a cap which is automatically moved into hermetic ejection orifice sealing engagement with the ink ejection head upon de-energization of the apparatus.

It is another object of the present invention to provide an ink ejection printing apparatus for ensuring hermetic sealing of the ink ejection orifice.

It is another object of the present invention to provide an ink ejection printing apparatus comprising means for ensuring gentle engagement of a cap with the injection head.

It is another object of the present invention to provide a generally improved ink ejection printing apparatus.

Other objects, together with the foregoing, are attained in the embodiments described in the following description and illustrated in the accompanying drawings.

BRIEF DESCRIPTION OF THE DRAWING

FIGS. 3a, 3b and 3c constitute in combination an electrical timing diagram for the electrical control circuit shown in FIG. 2;

FIG. 5 is a fragmentary sectional view of a sealing cap of the embodiment shown in FIG. 4 in a disengaged position relative to an ink ejection head; and FIG. 6 is similar to FIG. 5 but shows the cap engaged with the ejection head to hermetically seal an ink ejection orifice thereof.

DESCRIPTION OF THE PREFERRED EMBODIMENT

While the ink ejection printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
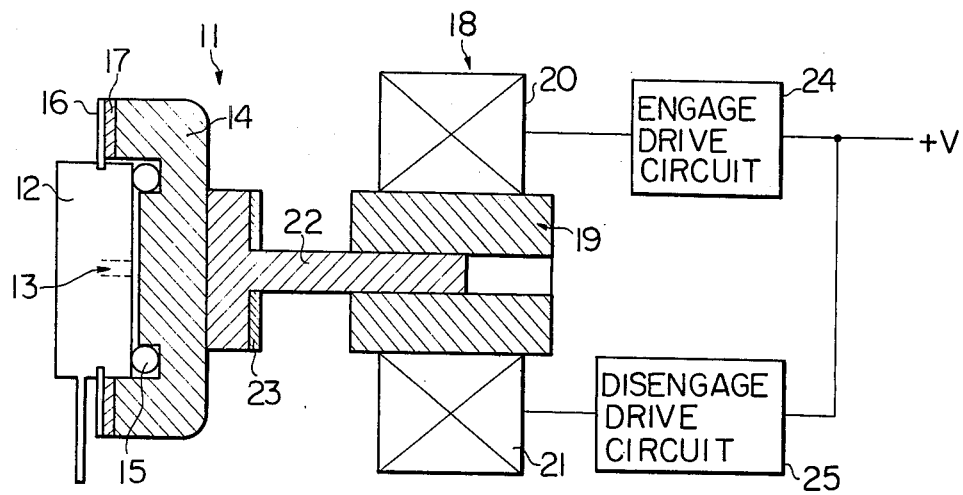
FIG. 1 is a longitudinal sectional view of a first embodiment of an ink ejection printing apparatus according to the present invention.

Referring now to FIG. 1 of the drawing, a first embodiment of an ink ejection printing apparatus 11 according to the present invention comprises an ink ejection head 12 formed with a central ink ejection orifice 13. Although not shown, the ink ejection head 12 comprises therein an electrostrictive plate to which electrical pulses are applied for ink ejection. An ink supply which is not shown and does not constitute part of the present invention is further connected to the ink ejection head 12.

The ink ejection head 12 is movable vertically as viewed in FIG. 1 by a drive system (not shown) and is illustrated in an inoperative or storage position. A copy sheet is disposed either above or below the ink ejection head 12 although not shown in such a manner that the ejection head 12 is movable from the storage position adjacent to and along the copy sheet to reproduce a scan line thereon by ink ejection.

A cap 14 is provided to sealingly engage with the ink ejection head 12 around the area of the ink ejection orifice 13 to hermetically seal the orifice 13. It has been determined in practice that such a cap 14, if maintained in engagement with the ink ejection head 12 whenever the head 12 is not actually being utilizing in a printing operation, positively prevents clogging of ink in the orifice 13.

The cap 14 is fitted with a resilient O-ring 15 which surrounds the ink ejection orifice 13 and is resiliently compressed to provide a hermetic seal. A ferromagnetic annular plate 16 integrally fixed to the ink ejection head 12 and an annular magnet 17 is integrally fixed to the cap 14 surrounding the O-ring 15 for magnetic engagement with the plate 16. In the position shown in FIG. 1, the cap 14 is firmly held in place against the ink ejection head 12 by means of the magnet 17.

A double-acting solenoid 18 comprises a ferromagnetic core 19 and engage and disengage coils 20 and 21 respectively. A plunger 22 slidingly fitted in the core 19 is fixed at its left end to the cap 14. An annular magnet 23 is further fixed to the cap 14 surrounding the plunger 22 and is magnetically holdingly engageable with the left end of the core 19 to hold the cap 14 in a disengaged position (not illustrated) from the ink ejection head 12. The engage coil 20, when energized, is operative to move the plunger 22 and thereby the cap 14 leftwardly into engagement with the ink ejection head 12 in the illustrated position so that the cap 14 is held to the head 12 by the magnet 17. The disengage coil 21, when energized, is operative to move the plunger 22 and thereby the cap 14 rightwardly until the magnet 23 abuts against the core 19 and the cap 14 is magnetically held in a position disengaged from the ink ejection head 12 by the magnet 23.

The apparatus 11 further comprises an electrical control circuit including an engage drive circuit 24 and a disengage drive circuit 25 to energize the coils 20 and 21 when a power source +V for the apparatus 11 is de-energized and energized respectively.

The apparatus 11 is designed in such a manner that at the end of a printing operation the ink ejection head 12 is moved to the inoperative position described above and the cap 14 is automatically moved to sealingly engage with the ink ejection head 12. The apparatus 11 is stored in this position with the power source +V de-energized.

The sequence of operation of the apparatus 11 is as follows. The apparatus operator energizes the power source +V which causes the disengage drive circuit 25 to produce an electrical signal which momentarily energizes the disengages drive coil 21 moving the cap 14 to the disengaged position at which it is held by the magnet 23. The ink ejection head 12 is then moved away from the storage position and utilized in a printing operation. The control circuit (not shown) for the facsimile or similar device in which the apparatus 11 is incorporated is designed to move the ink ejection head 12 to the storage position at the end of the printing operation. The operator then de-energizes the power source +V which causes the engage drive circuit 24 to produce an electrical signal which momentarily energizes the engage coil 20 to move the cap 14 to the engaged position hermetically sealing the ink ejection orifice 13.

Figure 2:
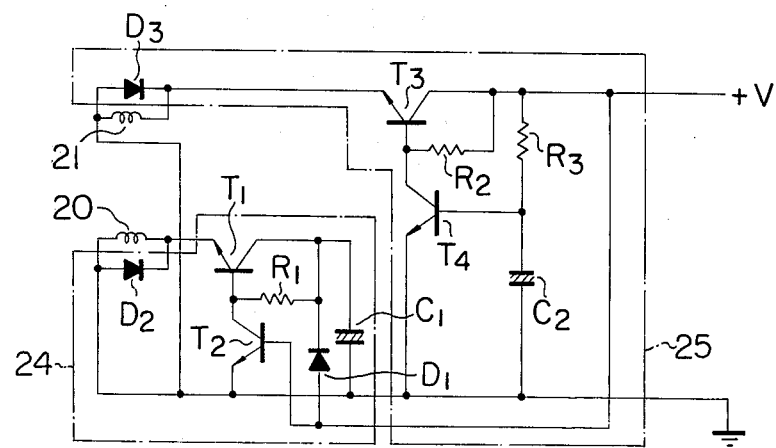
FIG. 2 is an electrical schematic diagram of an electrical control circuit for the printing apparatus shown in FIG. 1.

FIG. 2 illustrates an exemplary but preferred form of the drive circuits 24 and 25.

The engage drive circuit 24 comprises an NPN transistor T1 which serves as a driver to control current flow through the engage coil 20 and an NPN transistor T2 which serves as a switch for the transistor T1. The collector of the transistor T1 is connected to the cathode of a diode D1, the anode of which is connected to the power source +V, which is a positive DC supply. A capacitor C1 is connected between the collector of the transistor T1 and ground, and a resistor R1 is connected between the collector and base of the transistor T1. The collector of the transistor T2 is connected to the base of the transistor T1 and the emitter of the transistor T2 is grounded. The base of the transistor T2 is connected to the power source +V.

The emitter of the transistor T1 is grounded through the engage coil 20, and a diode D2 is connected in parallel with the coil 20. The anode of the diode D2 is grounded and the cathode of the diode D2 is connected to the emitter of the transistor T1. In this configuration, the switching transistor T2 is connected in a common emitter configuration with the resistor R1 constituting the collector load resistor. The driver transistor T1 is connected in a common collector or emitter follower configuration, with the coil 20 serving as the load.

The disengage drive circuit 25 comprises an NPN transistor T3 which serves as a driver to control current flow through the disengage drive coil 21 and an NPN transistor T4 which serves as a switch for the transistor T3. The collector of the transistor T3 is connected to the power source +V, and a resistor R2 is connected between the collector and base of the transistor T3. The emitter of the transistor T3 is grounded through the coil 21, and a diode D3 is connected in parallel with the coil 21. The anode of the diode D3 is grounded and the cathode of the diode D3 is connected to the emitter of the transistor T3.

The emitter of the transistor T4 is grounded and the collector of the transistor T4 is connected to the base of the transistor T3. A resistor R4 is connected between the base of the transistor T4 and the power source +V and a capacitor C2 is connected between the base of the transistor T4 and ground. The switching transistor T4 is connected in a common emitter configuration with the resistor R2 serving as the collector load resistor. The transistor T3 is connected in a common base or emitter follower configuration with the coil 21 serving as the load.

In operation, the power source +V is energized to initiate printing. It will be recalled that the cap 14 is in the engaged position. The power source +V is applied to the base of the transistor T2 to turn on the same. The voltage at the base of the transistor T1 is therefore essentially zero and the transistor T1 is turned off. The engage drive circuit 24 and thereby the engage coil 20 are thereby rendered inoperative.

When the power source +V is initially energized, the capacitor C2 is discharged. The voltage at the base of the transistor T4 is therefore essentially zero and the transistor T4 is turned off. The collector voltage of the transistor T4 is therefore essentially equal to the voltage of the power source +V, and this voltage applied to the base of the transistor T3 turns on the same. The power source +V is therefore connected across the coil 21 through the transistor T3, and current flow through the coil 21 the cap 14 to be moved to the disengaged position.

The capacitor C2, however, charges through the resistor R3 from the power source +V. After a period of time determined by the time constant of the resistor R3 and capacitor C2, the voltage across the capacitor C2 which is applied to the base of the transistor T4 is sufficient to cause the transistor T4 to conduct. The collector voltage of the transistor T4 drops to essentially zero thereby turning off the transistor T3 and de-energizing the coil 21. In this manner, the coil 21 is energized for a predetermined length of time upon energization of the power source +V.

After the printing operation is completed, the power source +V is de-energized, thereby rendering the disengage drive circuit 25 inoperative. Also, removal of the power source +V from the base of the transistor T2 turns off the transistor T2. During the printing operation, the capacitor C1 was charged up to the voltage of the power source +V. Upon de-energization of the power source +V, the capacitor C1 discharges through the transistor T1 and the engage coil 20 thereby energizing the coil 20 and moving the cap 14 into sealing engagement with the ink ejection head 12. In this case, the resistor R1 serves as a base bias resistor for the transistor T1 so that sufficient voltage is applied to the base of the transistor T1 through the resistor R1 from the capacitor C1 to turn on the transistor T1. The coil 20 will be de-energized when the capacitor C1 discharges below the holding current of the coil 20. In this manner, the coil 20 is energized for a predetermined length of time upon de-energization of the power source +V.

FIGS. 3a, 3b and 3c illustrate the operation of the drive circuits 24 and 25. FIG. 3a illustrates the energization of the power source +V. FIG. 3b illustrates the current flow through the disengage coil 21 and FIG. 3c illustrates the current flow through the engage coil 20.

Figure 4:
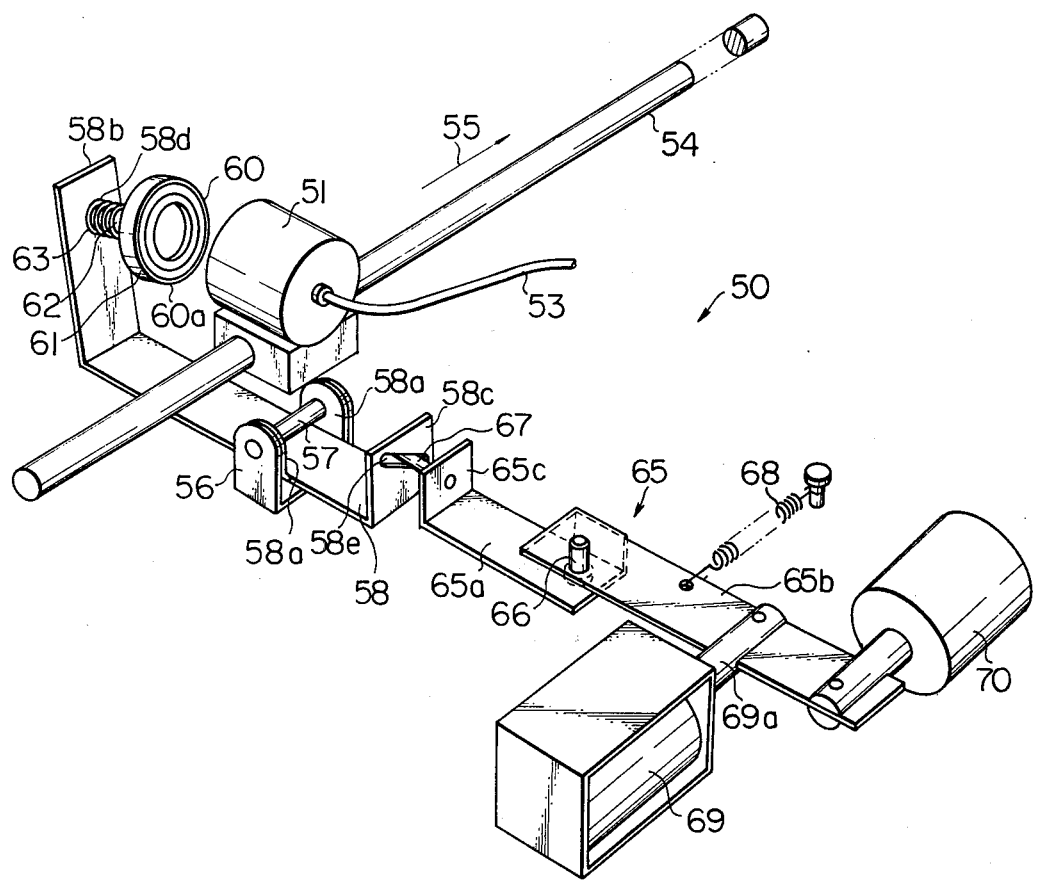
FIG. 4 is a perspective view of a second embodiment of an ink ejection printing apparatus according to the present invention.

FIG. 4 illustrates a second embodiment of an ink ejection printing apparatus 50 according to the present invention which comprises an ink ejection head 51 which is essentially similar to the ink ejection head 12 of the above embodiment and is formed with a central ink ejection orifice 52 which is visible in FIGS. 5 and 6. Also shown in FIG. 4 is a flexible tube 53 through which ink is supplied to the ink ejection head 51 and a carriage member 54 for moving the ink ejection head 51 from a storage position as illustrated in the direction of an arrow 55 to a printing position adjacent to a copy paper or sheet (not shown).

A fixed bracket 56 supports a fulcrum pin 57 which is aligned parallel to the carriage member 54. A link 58 is pivotally supported by the pin 57 by means of lugs 58a integrally extending upwardly from the link 58.

The intermediate portion of the link 58 is generally horizontal and ends 58b and 58c of the link 58 are perpendicularly bent so as to extend generally upwardly. A cap 60 is sealingly engageable with the ink ejection head 51 to hermetically seal the ink ejection orifice 52 as best seen in FIG. 6. The cap 60 comprises a resilient O-ring 61 as in the above embodiment which coaxially surrounds the orifice 52 and is resiliently sealingly deformed when the cap 60 is engaged with the ink ejection head 51. A rod 62 is fixed to the left side of the cap 60 and extends through a hole 58d formed in the end 58b of the link 58. A compression spring 63 is coaxially supported by the rod 62 and engages at its opposite ends with the cap 60 and the end 58b of the link 58. A retaining ring 64 is fixed to the end of the rod 62 so that the link 58 is disposed between the ring 64 and the spring 63.

The spring 63 is preloaded in such a manner as to hold the rod 62 and cap 60 horizontal as illustrated in FIG. 5 in conjunction with the ring 64 when the cap 60 is disengaged from the ink ejection head 51.

The diameter of the hole 58d through the end 58b of the link 58 is larger than the diameter of the rod 62 so that the rod 62 is tiltable relative to the end 58b of the link 58 within a conical locus determined by the diameter difference.

Referring back to FIG. 4, the end 58c of the link 58 is formed with a diagonal slot 58e. A lever 65 is pivotally supported for horizontal rotation by a fixed pin 66. The lever 65 is integrally composed of arms 65a and 65b. A horizontally extending pin 67 is fixed to an upwardly bent end 65c of the arm 65a and engages in the slots 58e of the link 58. A tension spring 68 is connected to the arm 65b to urge the lever 65 counterclockwise. An electrical solenoid 69 comprises a plunger 69a connected to the arm 65b in such a manner as to rotate the lever 65 clockwise against the force of the spring 68 when energized and a pneumatic damper 70 is also connected to the arm 65 to slow the movement of the lever 65 only in the counterclockwise direction.

In operation, the apparatus 50 is normally stored as shown in FIG. 6, with the cap 60 in sealing engagement with the ink ejection head 51. To utilize the apparatus 50, the operator pushes a start button (not shown) which momentarily energizes the solenoid 69. This causes the lever 65 to rotate clockwise against the force of the spring 68. The pin 67 is thereby moved rightwardly causing, through engagement in the slot 58e, the link 58 to rotate in such a manner that the end 58c moves upwardly and the end 58b moves downwardly. The cap 60 is thereby rocked downwardly out of engagement with the ink ejection head 51 to a disengaged position illustrated in FIG. 5.

With the cap 60 in the disengaged position, the ink ejection head 51 is moved away from the storage position for use. After the ink ejection head 51 is clear of the path of the cap 60, the solenoid 69 is de-energized. The spring 68 rotates the lever 65 counterclockwise with the movement thereof being slowed by the damper 70. This causes the link 58 to pivot in the direction opposite to that described above so that the cap 60 is rocked upwardly to a standby position.

When the printing operation is completed, the ink ejection head 51 returned to the storage position. As the ink ejection head 51 approaches the storage position, the solenoid 69 is again energized to move the cap 60 to the disengaged position described above. After the ink ejection head 51 has reached the storage position, the solenoid 69 is de-energized allowing the spring 68 to cause the cap 60 to rock toward the ink ejection head 51 by means of the lever 65 and link 58.

As illustrated in FIG. 6, the link 58 is designed to move further after the cap 60 engages with the ink ejection head 51. The cap 60 is formed with an outer lip 60a designed to eat on the face of the ink ejection head 51 with the O-ring 61 resiliently compressed. In this manner alignment of the cap 60 and the ink ejection head 51 for perfect sealing is assured.

Movement of the link 58 after seating of the cap 60 causes the spring 63 to be further compressed, therefore tightly pressing the cap 60 against the ink ejection head 51. The end 58b of the link 58 is allowed to tilt relative to the rod 62 since the diameter of the hole 58d is greater than that of the rod 62.

The damper 70 serves to slow movement of the lever 65 only in the counterclockwise direction, or the direction in which it is urged by the spring 68. The damper 70 therefore slows movement of the cap 60 toward the ink ejection head 51 in such a manner that the cap 60 slowly and smoothly glides into tight pressing engagement with the ink ejection head 51. This positively eliminates erroneours ink ejection caused by impact of the cap 60 against the ink ejection head 51 and consequent contamination of the cap 60 which would impair the sealing efficiency thereof.

In summary, it will be seen that the present invention completely solves the problem of ink clogs in the ink ejection orifice of an ink ejection printing apparatus by automatically hermetically sealing the orifice when the apparatus is not in actual operation. Many modifications to the embodiments shown and described herein are possible for those skilled in the art within the scope of the invention after receiving the teachings of the present disclosure

What is claimed is:

1. An ink ejection printing apparatus comprising:
    an ink ejection head formed with an ink ejection orifice;

a cap movable between a disengaged position spaced from the ink ejection head and an engaged position in engagement with the ink ejection head hermetically sealing the ink ejection orifice;

first biasing means urging the cap to the engaged position; and second biasing means to move the cap to the disengaged position against a force of the first biasing means.

2. An ink ejection printing apparatus as in claim 1, in which the second biasing means comprises an electrical solenoid.

3. A ink ejection printing apparatus as in claim 2, further comprising a damper to slow movement of the cap from the disengaged position to the engaged position.

4. An ink ejection printing apparatus as in claim 2, in which the cap comprises a resilient member for sealing engagement with the ink ejection head.

5. An ink ejection printing apparatus as in claim 4, in which the first biasing means comprises a permanent magnet to hold the cap in the engaged position.

6. An ink ejection pringing apparatus as in claim 5, in which the second biasing means comprises a permanent magnet to hold the cap in the disengaged position.

7. An ink ejection printing apparatus as in claim 6, in which the electrical solenoid of the second biasing means is arranged to move the cap from the engaged position to the disengaged position, the first biasing means comprising an electrical solenoid to move the cap from the disengaged position to the engaged position.

8. An ink ejection printing apparatus as in claim 7, further comprising an electrical control means connected to momentarily energize the electrical solenoid of the second biasing means in response to energization of an electrical power source and to momentarily energize the electrical solenoid of the first biasing means in response to de-energization of the electrical power source.

9. An ink ejection printing apparatus as in claim 8, in which the electrical control means comprises:

a first transistor connected to control current flow and turned off to de-energize the electrical solenoid of the first biasing means when the second capacitor discharges to a third predetermined voltage.

10. An ink ejection printing apparatus as in claim 4, in which the first biasing means comprises a spring.

11. An ink ejection printing apparatus as in claim 10, further comprising a link connecting the electricl solenoid and the spring to the cap, the link including resilient means arranged to deform upon engagement of the cap with the ejection head.

12. An ink ejection printing apparatus as in claim 11, in which the resilient means comprises a rod coaxially fixed to the cap and extending through an opening formed through the link, the opening being larger in diameter than the rod, a compression spring coaxially surrounding the rod and engaging at its ends with the cap and the link and a retainer fixed to the rod such that the link is disposed between the retainer through the electrical solenoid of the second biasing means;

a first capacitor connected to be charged from the electrical power source, the first transistor being connected to the first capacitor in such a manner that the first transistor is initially turned on by the electrical power source to energize the electrical solenoid of the second biasing means and subsequently turned off to-energize the electrical solenoid of the second biasing means when the first capacitor is charged to a first predetermined voltage;

a second transistor connected to control current flow through the electrical solenoid of the first biasing means;

a second capacitor connected to be charged to a second predetermined voltage from the electrical power source, the second transistor being connected to the second capacitor in such a manner that the second transistor is initially turned off by the electrical power source to de-energize the electrical solenoid of the first biasing means, turned on to energize the electrical solenoid of the first biasing means in response to de-energization of the electrical power source by the second predetermined voltage across the second capacitor and the compression spring.

13. An ink ejection printing apparatus as in claim 11, in which the link is pivotal about an intermediate fulcrum and is perpendicularly bent at opposite ends thereof, the cap being mounted at one bent end of the link and the other bent end of the link being formed with a diagonal slot, the electrical solenoid including a pin engaging in the diagonal slot and being arranged for movement parallel to the fulcrum of the link in response to energization and de-energization of the electrical solenoid so that the link is rocked about the fulcrum to move the cap to the disengaged and engaged position respectively.

14. An ink ejection printing apparatus as in claim 13, in which the electrical solenoid further comprises a plunger and a lever, the pin being fixed to the lever and the plunger being connected to pivot the lever.

15. An ink ejection printing apparatus as in claim 14, in which the lever is pivotal about an intermediate fulcrum, the pin being fixed to a first arm of the lever and the plunger and spring being connected to a second arm of the lever.